(12) United States Patent
Heinrici et al.

(10) Patent No.: US 8,698,039 B2
(45) Date of Patent: Apr. 15, 2014

(54) METHOD AND ARRANGEMENT FOR FIRM BONDING OF MATERIALS

(75) Inventors: Axel Heinrici, Aachen (DE); Lars-Soren Ott, Duren (DE)

(73) Assignee: Reis Group Holding GmbH & Co. KG, Obernburg (DE)

( * ) Notice: Subject to any disclaimer, the term of this patent is extended or adjusted under 35 U.S.C. 154(b) by 354 days.

(21) Appl. No.: 13/027,782

(22) Filed: Feb. 15, 2011

(65) Prior Publication Data

US 2011/0210099 A1      Sep. 1, 2011

(30) Foreign Application Priority Data

Feb. 26, 2010   (DE) .......................... 10 2010 000 564
Apr. 23, 2010   (DE) .......................... 10 2010 016 628

(51) Int. Cl.
*B23K 26/00* (2014.01)
*B23K 26/20* (2014.01)

(52) U.S. Cl.
USPC .............. 219/121.6; 219/121.62; 219/121.63; 219/121.64

(58) Field of Classification Search
USPC ................ 219/121.6–121.66, 121.83, 121.85
See application file for complete search history.

(56) References Cited

U.S. PATENT DOCUMENTS 3,544,757 A  * 12/1970 Taudvin et al. .......... 219/121.66
5,234,151 A  *  8/1993 Spigarelli ..................... 228/103
7,009,138 B2 *  3/2006 Amako et al. ........... 219/121.64
2004/0114662 A1 *  6/2004 Messler ....................... 374/130
2009/0294412 A1   12/2009 Kono

FOREIGN PATENT DOCUMENTS

| DE | 10064487 | 7/2002 |
|---|---|---|
| DE | 102 61 422 A1 | 7/2004 |
| DE | 10261422 | 7/2004 |
| DE | 1020 4050164 | 4/2006 |
| DE | 1020 7019812 | 10/2008 |
| EP | 1020249 | 7/2000 |
| EP | 1477258 | 11/2004 |
| JP | 01087713 A * | 3/1989 |
| WO | 91/14529 A1 | 10/1991 |
| WO | 9114529 | 10/1991 |
| WO | 2006/093264 A1 | 9/2006 |
| WO | 2006093264 | 9/2006 |

OTHER PUBLICATIONS

International Search Report for Application No. EP 11 15 6144, Jun. 2011.

* cited by examiner

*Primary Examiner* — Samuel M Heinrich
(74) *Attorney, Agent, or Firm* — Ladas & Parry LLP

(57) ABSTRACT

A method and an arrangement for a firm bonding of a first material with a second material by means of soldering through focused laser radiation impacting on the first material, with the output controlled in dependence on the temperature measured in the area of the impacting focused laser radiation. To assure that surface properties will not lead to a noticeable distortion of the material temperature to be measured so that a reproducible, high quality soldering will be possible, it is provided for the temperature to be measured in an area of the first material that is adjacent to that in which the focused laser radiation impacts on the first material, with the area in which the temperature is measured and the area of impact of the laser radiation lying within the area of the soldering spot.

20 Claims, 3 Drawing Sheets

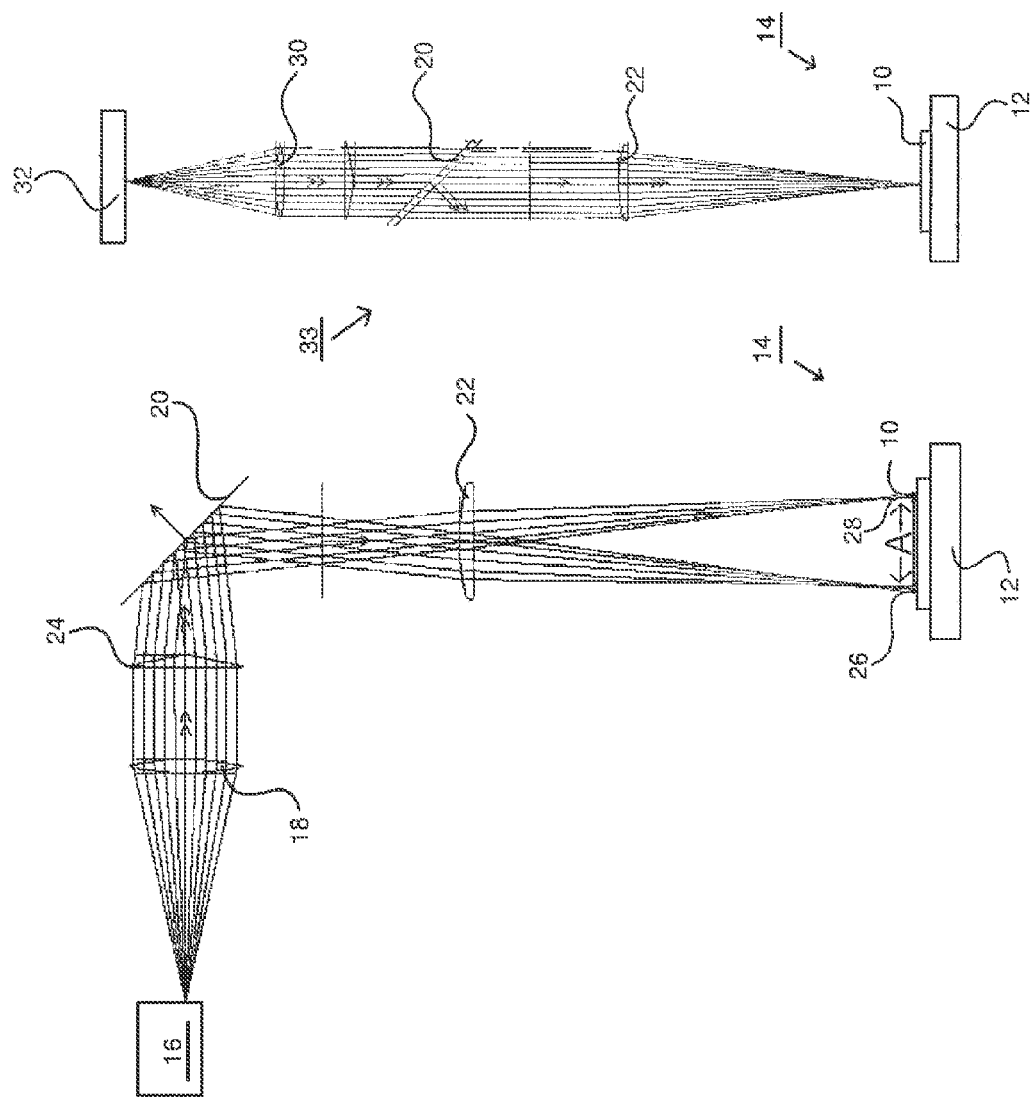

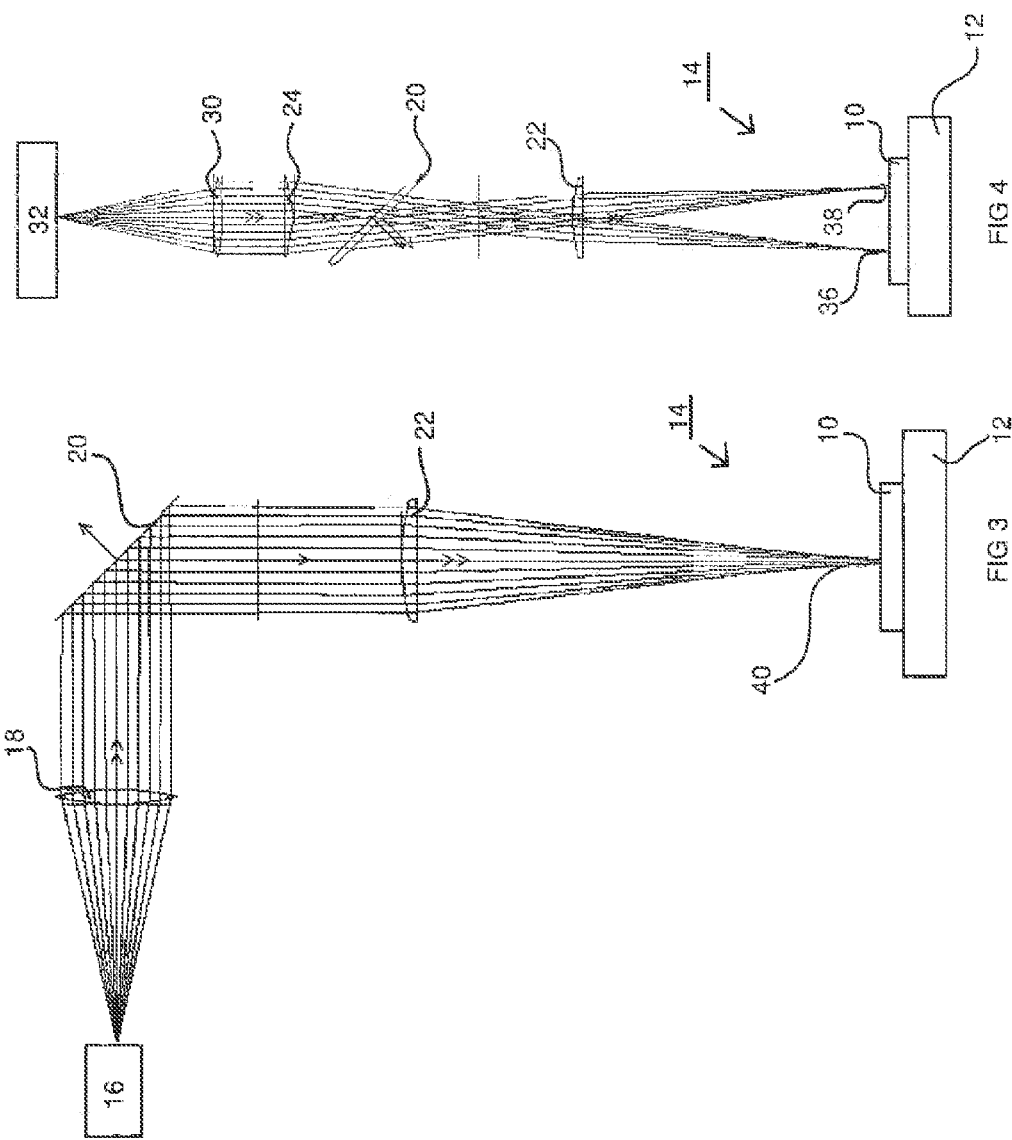

METHOD AND ARRANGEMENT FOR FIRM BONDING OF MATERIALS

BACKGROUND OF THE INVENTION

The invention relates to a method for a firm bonding of a first material with a second material by means of soldering through focused laser radiation impacting on the first material whose output is controlled in dependence of the temperature measured through heat radiation emitted by the first material in the direction of the laser radiation. The invention also makes reference to an arrangement for the soldering of a first material onto a second material comprising a laser source emitting a laser radiation; a first optics focusing the laser radiation onto the first material; a sensor that, via the first optics, registers the heat radiation emitted by the first material as measuring radiation; as well as a beam splitter via which the laser radiation from the beam path of the measuring beam path or the measuring beam path from the beam path of the laser radiation can be deflected.

Lasers, in particular fiber-coupled lasers, may be used for soft-soldering connectors such as copper strips onto solar cells in order to interconnect them to form solar modules. According to the state of the art, the laser radiation is first collimated and combined with the beam path of a pyrometer in order to focus the sensor of the pyrometer and the laser spot coaxially onto the copper strip. In this context, laser and pyrometer form a closed servo loop. In this case, a chronologically adjustable set-point temperature will be specified. A controller adjusts the laser output in such a way that the set-point temperature will be attained as closely as possible. In this case, laser spot and measuring point will coincide. This results in the disadvantage that the laser radiation may influence and distort the pyrometer measuring. For example, absorbing or poorly heat conducting materials may be imbedded on the surface of the copper strips, such as dust, flux materials, oxides. Therefore, the laser radiation may generate sparks or other local heat sources on the surface that, however, do not reflect the temperature of the material itself.

These influences leading to measuring errors occur in particular within the temperature range of soft soldering since highly sensitive pyrometers are used for low temperatures.

A method forming its own generic category can be found in DE-A-100 64 487. In order to control the output of the laser beam, the temperature at the point of impact of the laser on the soldering spot is measured contact-free. To this end, a radiation pyrometer is integrated into the laser beam source.

The subject of DE-A-10 2004 050 164 is a welding method by means of laser radiation. In order to measure the amount of energy entered for controlling the output of the laser radiation, the temperature on the side of the material to be welded lying opposite the welding spot is measured by means of a pyrometer.

From EP-A-1 477 258, a device and a method for local temperature treatment with a heat detector and image processing have been known. In this case, the temperature at the point of impact of the laser radiation on an object is measured by means of a pyrometer. The heat radiation to be measured is decoupled from the laser radiation as reradiation.

SUMMARY OF THE INVENTION

The invention at hand is based on the objective of further developing a method and an arrangement of the kind mentioned at the beginning in such a way that, in particular, surface properties of the first material or of foreign material substances present on the first material will not lead to a noticeable falsification of the material temperature to be measured so that a reproducible, high quality soldering process will be made possible.

For a solution of the invention, it is proposed to measure the temperature in an area of the first material lying adjacent to the one on which the focused laser radiation impacts on the first material.

According to the invention, the area in which the laser radiation impacts lies spatially separated, i.e. at a distance, from the area in which the temperature is measured.

Consequently, the area of the temperature measurement and the area of the impacting laser radiation lie in the area of the soldering spot, but spatially separated within this area, i.e. at a distance.

In particular, it is provided that the laser radiation is projected onto the first material in at least two foci distanced from each other and that heat radiation is registered by the sensor as the measuring radiation emitted by the area of the first material that runs between the foci.

Also, there is the possibility for the laser radiation to be projected in a ring-shaped focus area on the first material and for heat radiation of the first material to be measured as the measuring radiation that is emitted within the ring-shaped focus area.

The invention is not abandoned even if the laser radiation is not measured but, instead, the heat radiation emitted in a ring-shaped area of the first material that coaxially surrounds a focus projected onto the first material, or, respectively, if the laser radiation is projected in a focus on the first material and heat radiation emitted in two areas of the first material preferably running diametrically to the focus is measured as the measuring radiation.

For a splitting of the laser radiation or, respectively, a consolidation of the heat radiation, i.e., in the strictest sense, of the projection of the sensor on the first material, a refractive optical element such as an Amici prism or axicon or a diffractive optical element or a reflective optical element will be used.

In refractive eye surgery, it has been known to split a laser radiation into several foci by means of a beam splitter device. This is supposed to reduce the treatment time (DE-A-10 2007 019 812).

From EP-A-1 020 249 it has been known to cut and weld metals by means of laser beams. In this context, it is possible to create a double spot in order to make an additional wire during the welding process or a supply of gas in the area of the spots possible.

In accordance with the invention, a splitting of the laser radiation will preferably occur in such a way that at least two foci are projected onto the material that is to be soldered on. In this case, it involves focus areas or spots in the literal sense. To that extent, the terms are to be understood as synonyms. Substances influencing the properties of the surface of the material, such as dust, flux agents and/or oxides, can no longer lead to a distortion of the measured temperature of the material itself since the measuring is not done in the spot but next to the spot.

In order to carry out an extremely precise measurement of the temperature in the area of the spots, the heat radiation is measured immediately next to the latter, preferably between two spots. Other geometries for the focus area and the measuring of the temperature in the area of the laser spot or, respectively, of the spots are possible as well, in which case the heat radiation is registered by the sensor as measuring radiation that is emitted outside of the spot or, respectively, of the spots. Based on the doctrine in accordance with the invention, the set-point temperature used as the control variable may be reduced. The laser output delivered will remain on the same level, with the output fluctuating less from component to component. If, on the other hand, the temperature is measured in the laser spot, the set-point temperature must be set so high that the component is sufficiently supplied with laser output regardless of any distortion of the sensor signal towards seemingly higher temperatures. In this case, the distortions will greatly fluctuate on an actual component surface. This will lead to process fluctuations.

With the doctrine in accordance with the invention, the soldering of a first material onto a second material, in particular of an electric connector such as a copper strip on a semiconductor component such as a solar cell, is made possible in a servo loop at a lower set-point temperature used as control variable as compared with the state of the art; however, it must be assured that an impermissibly high temperature leading to damages will not be generated. Moreover, extremely reproducible soldering results will result.

In particular, it is provided for the laser radiation to be divided and focused onto two laser spots in such a way that the center to center distance A between two foci is 1.0 mm≤A≤2.5 mm with a respective focus diameter D of 0.5 mm≤D≤1.5 mm while maintaining an area uncovered by the foci on the first material from which any emitted heat radiation is measured as the measuring radiation.

An arrangement of the kind mentioned at the beginning is characterized, on the one hand, by the fact that, between the laser source and the beam splitter, a second optics splitting the laser radiation is arranged that projects the laser radiation onto the first material in two foci located at a distance from each other or in a ring-shaped focus area, with an area of the first material emitting the heat radiation to be measured running between the at least two foci or within the ring-shaped focus area. On the other hand, the arrangement is characterized by the fact that, between the sensor and the beam splitter, a second optics is arranged via which radiation emitted by two areas of the first material located at a distance from each other or radiation emitted by a ring-shaped area is projectable onto the sensor as the measuring radiation. In this case, the radiation is projectable into the area between the two areas or the ring-shaped area that emit or, respectively, emits the radiation to be measured.

In particular, it is provided for the first material to be an electric connector and the second material, a semiconductor material such as a solar cell.

In particular, the second optics being used is designed in such a way that two foci on the first material with a center to center distance A between 1.0 mm≤A≤2.5 mm and a respective focus diameter D of 0.5 mm≤D≤1.5 mm are projectable onto the first material while maintaining an area uncovered by the foci. In this case, the second optics, in particular, is a refractive optical element or a reflective optical element.

BRIEF DESCRIPTION OF THE DRAWINGS

Additional details, advantages and characteristics of the invention will result not only from the claims, the characteristics to be derived therefrom—per se and/or in combination—but also from the following description of preferred embodiments that can be found in the drawings.

Shown are:

FIG. 1 a first laser beam path,

FIG. 2 a measuring beam path allocated to the first laser beam path,

FIG. 3 a second laser beam path,

FIG. 4 a measuring beam path allocated to the second laser beam path,

DESCRIPTION OF THE PREFERRED EMBODIMENTS

Figure 6:
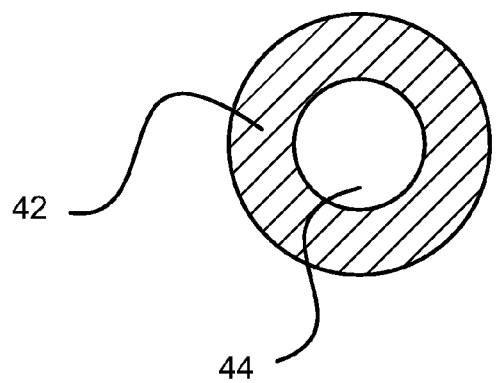

In the following, the doctrine in accordance with the invention will be described on the basis of the soldering of a copper strip onto a solar cell for their interconnection to form a solar module, without the doctrine in accordance with the invention being limited thereto. Instead, the doctrine in accordance with the invention can be used everywhere where mating parts are to be joined with each other in firmly bonded fashion.

The elements used, such as lasers, pyrometers for the measuring of heat radiation in the soldering area as well as the optics used for the beam splitting described below, involve commercial products that are known to a person skilled in the art of soft soldering with the use of a fiber-coupled laser so that no further explanations will be necessary.

In FIGS. 1 through 4 in which the same reference symbols are used for the same elements, laser and pyrometer beam paths are represented purely in principle in order to set the temperature in a soldering spot to a desired temperature in a control process. In this context, the control variable is a preset set-point temperature dependent of the materials of the components that are to be joined in firmly bonded fashion.

As mentioned before, the invention will be explained by way of the soldering of a conductor such as a copper strip onto a solar cell 12. A corresponding connector 10 serves to interconnect the solar cells to a module.

In accordance with the state of the art, pyrometer beam path and laser beam path are aligned coaxially relative to each other in front of the soldering spot 14 although the doctrine in accordance with the invention is not to be compellingly limited by this.

For the sake of simplification of the representation, laser beam path and pyrometer beam path will be represented separately for the various embodiments. Coaxiality will result when the representations are placed on top of each other.

The laser radiation is generated in particular via a fiber-coupled laser 16. In FIGS. 1 and 3, a collimator optics 18, a beam splitter 20 as well as a focusing optics 22 are subsequently arranged in the beam path.

Figure 5:
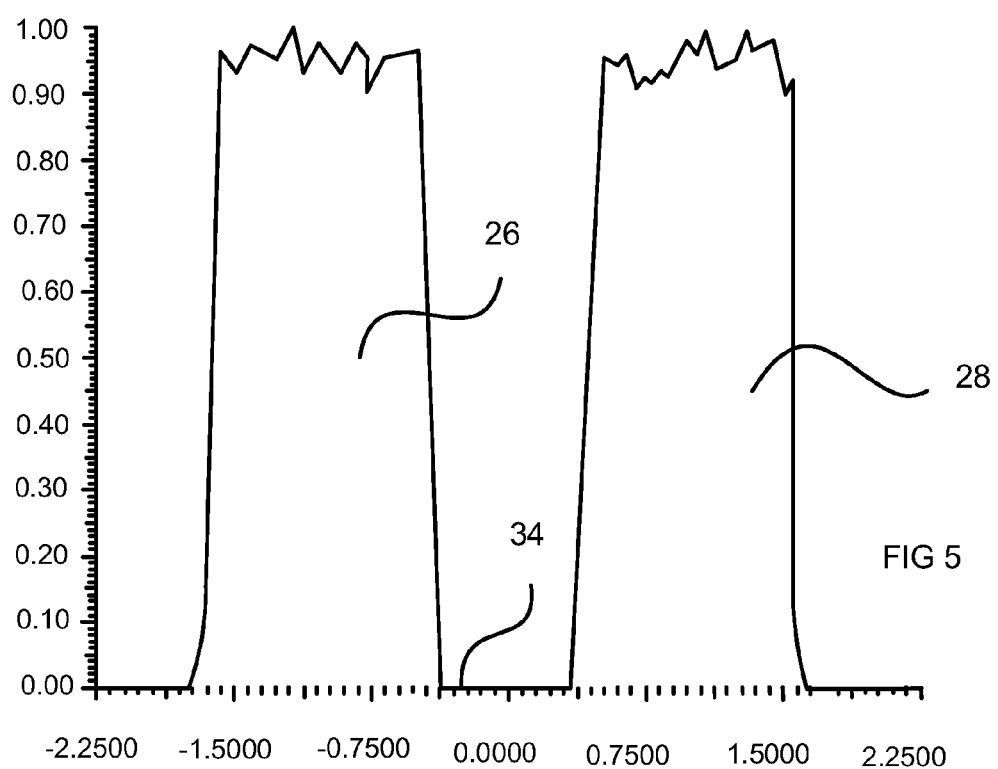
FIG. 5 representations of two laser spots generated with the aid of a diffractive optics, and FIG. 6 a laser spot running in a ring shape and generated with the aid of an axicon.

Moreover, in accordance with FIG. 1, a refractive optical element 24, in particular in the form of an Amici prism or of an axicon, is arranged between the collimator optics 18 and the beam splitter 20 in order to split the laser radiation in accordance with FIGS. 1 and 5 in such a way that two foci 26, 28 located at a distance from each other are projected onto the connector 10 that, in the actual sense, are spots, i.e. they have a two-dimensional extension. In this case, the effective diameter of each individual spot may lie between 0.6 mm and 1.5 mm, preferably in the range of 1.2 mm. The distance A of the centers of the spots 26, 28 should lie within the range of between 1.5 and 2.5 mm, with the distance A to be selected in such a way that the laser spots will not overlap, i.e. that between these effective laser spots 26, 28, an area of the connector 10 not covered by the latter will be present. In accordance with the invention, the temperature of the connector 10 is measured in this area in accordance with the embodiments of FIGS. 1, 2 and 5. To determine the temperature, the heat radiation is projected onto the sensor of a pyrometer 32 via the focusing optics 22 and the beam splitter 20 and a collimator optics 30.

In the drawn representation of FIGS. 2 and 4, the beam direction is drawn in as if the sensor of the pyrometer 32 is projected onto the connector 10. Reversibility of the beam path is possible since in physics, there is no difference between the optics projecting the heat radiation of the connector 10 onto the sensor of the pyrometer 32 and projecting the sensor onto the connector 10. The projection of the sensor onto the connector 10 is drawn in such a way that the beam direction is shown in accordance with the laser radiation.

As a comparison of FIGS. 1 and 2 clearly indicates, the measuring radiation 33 starts from an area of the soldering spot 14 that lies between the laser spots so that any distortion of the measured temperatures through surface properties of the connector 10 influencing the laser radiation will be precluded. Sparks or other local heat sources that lead to distortions due to, for example, dust, flux agents, oxides or surface structures are not taken into account in the determination of the temperature of the connector 10 in the area of the soldering spot 14. Thus, the output of the laser 16 to be controlled in dependence of the measured temperatures will fluctuate less than compared with the methods according to which the measuring takes place directly in the laser spot. Consequently, extremely reproducible firmly bonded connections can be produced. At the same time, any impermissible heating of the components to be joined and of any materials surrounding such components will be avoided.

With the aid of FIG. 5, it is made clear, purely in terms of principle, that, with an Amici prism as refractive optical element 24, there is the possibility of projecting two laser spots having a small nominal diameter and lying at a small distance from each other onto one soldering area. The temperature is then measured between the laser spots by means of the pyrometer. The corresponding area is marked as 34 in FIG. 5. In this case, the temperature measuring area runs at a distance from the spots but within the area of the soldering spot 14.

The example of an embodiment of FIGS. 3 and 4 differs from FIGS. 1 and 2 in that it is not the laser radiation that is split by means of the refractive optical element 24 but the pyrometer beam path, i.e. the temperature of the soldering spot 14 is measured from two areas located at a distance from each other. In FIG. 1, the corresponding measuring points are marked with reference symbols 36, 38. Between measuring points 36, 38, the focused laser beam impacts on the connector 10. In FIG. 3, the corresponding laser spot is marked with the reference symbol 40. To assure a splitting of the pyrometer beam or, respectively, a merging of the heat radiation emitted by the measuring points 36, 38, a refractive optical element in the form of an Amici prism or axicon that corresponds to that of FIG. 1 and that therefore is marked with reference symbol 24 is arranged between the beam splitter 20 and the collimator optics 30 as shown in FIG. 4.

However, there is also the possibility of splitting the laser radiation or the pyrometer radiation by means of a diffractive optical element in the form of an axicon in such a way that, in the case of the laser radiation, a ring-shaped laser spot results; the latter can be found, purely as a matter of principle, in FIG. 6. If the soldering spot 14 is impacted with a corresponding ring-shaped laser spot 42, the soldering area within the ring-shaped laser spot 42 marked in FIG. 6 with reference symbol 44 is measured as the measuring point for the temperature determination.

Ring geometries with an external diameter of 1.5 mm to 4.0 mm and an interior diameter within a range between 0.5 mm and 1.0 mm can be created by means of a corresponding optics. These dimensions will facilitate an assured registration of the temperature within the ring-shaped laser spot 42 without any surface properties of the connector 10 distorting the measurings.

If the doctrine in accordance with the invention has been explained by way of two spots and one measuring point running between the spots in the area of the soldering spot 14 or, respectively, two measuring points and one laser spot projected between the measuring points in the area of the soldering spot 14 or, respectively, through a ring geometry of the laser spot or, respectively, of the measuring area, the doctrine in accordance with the invention will not be limited thereby. Instead, more than two laser spots or, respectively, measuring points may be employed with the use of a suitable optics in order to control the laser output based on the measured temperatures in such a way that good soldering results will be achievable without extreme outputs needing to be set.

The temperature is measured in the soldering spot 14 or, respectively, in its area in which the firm bonding between the mating parts occurs by means of laser radiation.

The invention has been described in the example of an embodiment by way of the soldering of a copper strip onto a solar cell. This does not limit the invention. A further example to be mentioned is the soldering of tin-coated copper strips onto other tin-coated copper strips.

In summary, the invention relates to a method and an arrangement for a firm bonding of a first material with a second material by means of soldering through focused laser radiation impacting on the first material whose output is controlled in dependence of the temperature measured in the area of the impacting laser radiation. To make sure that, in particular, no surface properties will lead to any noticeable distortion of the material temperature to be measured so that a reproducible high quality soldering will be made possible, it is provided for the temperature to be measured in an area of the first material that is adjacent to that on which the focused laser radiation impacts on the first material, with the area in which the temperature is measured and the area of impact of the laser radiation lying within the area of the soldering spot.

LIST OF REFERENCE SYMBOLS 10 connector
12 solar cell
14 soldering spot
16 laser
18 collimator optics
20 beam splitter
22 focus optics
24 refractive optical element
26 focus
28 focus
30 collimator optics
32 pyrometer
33 measuring radiation
36 measuring point
38 measuring point
40 laser spot
42 laser spot
44 soldering area

What is claimed is:

1. Method for a firm bonding of an upper first material onto a lower second material by means of soldering through focused laser radiation impacting on the first material whose output is controlled in dependence of the temperature measured through heat radiation emitted by the first material in the direction of the laser radiation, wherein the temperature is measured in an area of the first material that is adjacent to, and spatially separated from, an area on which the focused laser radiation impacts on the first material;

wherein a heat-measuring sensor is used to measure the temperature whose measuring beam path prior to the impact on the first material runs parallel to or coaxially with the laser beam path; and wherein the laser radiation is projected onto the first material in at least two foci located at a distance from each other and that heat radiation is registered by the sensor as the measuring radiation that is emitted by the area of the first material running between the foci.

2. Method in accordance with claim 1, wherein the heat radiation emitted by a ring-shaped area of the first material is registered as the measuring radiation that envelops coaxially a focus of the laser radiation projected onto the first material.

3. Method in accordance with claim 1, wherein the laser radiation is projected in a focus on the first material and that the heat radiation emitted in at least two areas of the first material preferably running diametrically to the focus is measured as the measuring radiation.

4. Method in accordance with claim 1, wherein the laser radiation is split and focused in such a way that center to center distance A between two foci is 1.0 mm≤A≤2.5 mm with in each case a focus diameter D with 0.5 mm≤D≤1.5 mm while maintaining an area uncovered by the foci on the first material from which emitted heat radiation is measured as the measuring radiation.

5. Method in accordance with claim 1, wherein a connector such as a copper strip is used as first material and a semiconductor component such as a solar cell as second material.

6. Method for a firm bonding of an upper first material onto a lower second material by means of soldering through focused laser radiation impacting on the first material whose output is controlled in dependence of the temperature measured through heat radiation emitted by the first material in the direction of the laser radiation, wherein the temperature is measured in an area of the first material that is adjacent to, and spatially separated from, an area on which the focused laser radiation impacts on the first material; and wherein the laser radiation is projected onto the first material in a focus area running in the shape of a ring and that heat radiation of the first material is measured as the measuring radiation that is emitted within the ring-shaped focus area.

7. Method in accordance with claim 6, wherein a connector such as a copper strip is used as first material and a semiconductor component such as a solar cell as second material.

8. Method for a firm bonding of an upper first material onto a lower second material by means of soldering through focused laser radiation impacting on the first material whose output is controlled in dependence of the temperature measured through heat radiation emitted by the first material in the direction of the laser radiation, wherein the temperature is measured in an area of the first material that is adjacent to, and spatially separated from, an area on which the focused laser radiation impacts on the first material; and wherein the laser radiation or the measuring radiation is split via a refractive optical element such as an Amici prism or an axicon or via a diffractive optical element or via a reflecting optical element.

9. Method in accordance with claim 8, wherein the laser radiation is split and focused in such a way that center to center distance A between two foci is 1.0 mm≤A≤2.5 mm with in each case a focus diameter D with 0.5 mm≤D≤1.5 mm while maintaining an area uncovered by the foci on the first material from which emitted heat radiation is measured as the measuring radiation.

10. Method in accordance with claim 8, wherein a connector such as a copper strip is used as first material and a semiconductor component such as a solar cell as second material.

11. Method for a firm bonding of an upper first material onto a lower second material by means of soldering through focused laser radiation impacting on the first material whose output is controlled in dependence of the temperature measured through heat radiation emitted by the first material in the direction of the laser radiation, wherein the temperature is measured in an area of the first material that is adjacent to, and spatially separated from, an area on which the focused laser radiation impacts on the first material; and wherein a beam splitter is arranged in the measuring beam path of the sensor that, on the one hand, is penetrated by the measuring radiation and that, on the other hand, deflects the laser radiation, or vice versa.

12. Method in accordance with claim 11, wherein the laser radiation is split and focused in such a way that center to center distance A between two foci is 1.0 mm≤A≤2.5 mm with in each case a focus diameter D with 0.5 mm≤D≤1.5 mm while maintaining an area uncovered by the foci on the first material from which emitted heat radiation is measured as the measuring radiation.

13. Method in accordance with claim 11, wherein a connector such as a copper strip is used as first material and a semiconductor component such as a solar cell as second material.

14. Arrangement for soldering a first material onto a second material comprising a laser source emitting laser radiation; a first optics focusing the laser radiation on the first material; a sensor that registers heat radiation emitted by the first material as measuring radiation via the first optics; as well as a beam splitter via which the laser radiation from the beam path of the measuring beam path or the measuring radiation from the beam path of the laser radiation can be deflected, wherein a second optics splitting the laser radiation is arranged between the laser source and the beam splitter that projects the laser radiation onto the first material in at least two foci located at a distance from each other or in a ring-shaped focus area, with an area of the first material emitting the heat radiation to be measured running between the at least two foci or within the ring-shaped focus area.

15. Arrangement in accordance with claim 14, wherein the first material is an electrical connector and the second material, a semiconductor component such as a solar cell.

16. Arrangement in accordance with claim 14, the two foci on the first material having a center to center distance A of between 1.0 mm≤A≤2.5 mm and a respective focus diameter D of 0.5 mm≤D≤1.5 mm are projectable by means of the second optics while maintaining an area on the first material uncovered by the foci, or that the ring-shaped focus area with an exterior diameter of between 1.5 mm and 4.0 mm and an interior diameter of between 0.5 mm and 1.0 mm is projectable onto the first material.

17. Arrangement for soldering a first material onto a second material comprising a laser source emitting laser radiation; a first optics focusing the laser radiation on the first material; a sensor that registers heat radiation emitted by the first material as measuring radiation via the first optics; as well as a beam splitter via which the laser radiation from the beam path of the measuring beam path or the measuring radiation from the beam path of the laser radiation can be deflected,
  wherein between the sensor and the beam splitter a second optics is arranged via which the radiation emitted by two areas of the first material located at a distance from each other or by a ring-shaped area is projectable onto the sensor as the measuring radiation, with the laser radiation being projectable between the two areas or within the ring-shaped area.

18. Arrangement in accordance with claim 17, wherein the first material is an electrical connector and the second material, a semiconductor component such as a solar cell.

19. Arrangement in accordance with claim 11, two foci on the first material having a center to center distance A of between $1.0 \text{ mm} \leq A \leq 2.5 \text{ mm}$ and a respective focus diameter D of $0.5 \text{ mm} \leq D \leq 1.5 \text{ mm}$ are projectable by means of the second optics while maintaining an area on the first material uncovered by the foci, or that a ring-shaped focus area with an exterior diameter of between 1.5 mm and 4.0 mm and an interior diameter of between 0.5 mm and 1.0 mm is projectable onto the first material.

20. Arrangement in accordance with claim 17, wherein the second optics is a refractive optical element, in particular an Amici prism or an axicon, or a diffractive optical element or a reflecting optical element.

* * * * *